United States Patent [19]

Tsuru

[11] Patent Number: 5,352,418
[45] Date of Patent: Oct. 4, 1994

[54] FILTERING MATERIAL AND METHOD OF PRODUCING THE SAME

[75] Inventor: Sumiaki Tsuru, 9-7, Tagara 3-chome, Nerima-ku, Tokyo 179, Japan

[73] Assignees: Sumiaki Tsuru; Kunihiro Yamamoto, both of Tokyo, Japan

[21] Appl. No.: 973,010

[22] Filed: Nov. 5, 1992

[30] Foreign Application Priority Data

Nov. 5, 1991 [JP] Japan .................................. 3-317478

[51] Int. Cl.$^5$ ............................ A62B 7/08; B05D 5/00
[52] U.S. Cl. ..................................... 422/122; 427/202; 427/203; 427/244; 427/361; 427/384; 427/421; 427/422; 427/439; 427/419.1; 427/2.31
[58] Field of Search ............... 427/244, 421, 422, 439, 427/428, 203, 202, 419.1, 2, 384, 361; 422/120, 122

[56] References Cited

U.S. PATENT DOCUMENTS

| | | | |
|---|---|---|---|
| 4,075,405 | 2/1978 | Takahashi et al. | 536/1 |
| 4,398,023 | 8/1983 | Miyachi et al. | 536/1.1 |
| 5,143,752 | 9/1992 | Nakajima et al. | 427/244 |

*Primary Examiner*—Janyce Bell
*Attorney, Agent, or Firm*—Wenderoth, Lind & Ponack

[57] ABSTRACT

A filtering material employable for a variety of application fields in the form of a sanitary mask, a deodoring filter or the like comprises calcium phosphate particles, $\beta$-1,3-glucan and a band-shaped raw material, and the calcium phosphate particles each serving as a filtering medium are caused to adhere to the sheet-shaped raw material with the aid of the $\beta$-1,3-glucan serving as a binder. A method of producing a filtering material is practiced by way of a first step of stirring a predetermined quantity of calcium phosphate particles and a predetermined $\beta$-1,3-glucan in hot water at a high speed to prepare an aqueous treatment solution, a second step of dipping a sheet-shaped raw material in the aqueous treatment solution and taking up the sheet-shaped raw material, and a third step of drying the sheet-shaped raw material after completion of the taking-up operation. A second step of spraying the aqueous treatment solution over the sheet-shaped raw material may be substituted for the aforementioned second step. In addition, a step of allowing the aqueous treatment solution to adhere to the sheet-shaped raw material with the aid of a rolling roller may be substituted for the aforementioned second step. An aqueous preliminary treatment solution having a predetermined quantity of $\beta$-1,3-glucan uniformly dispersed in hot water may be substituted for the aforementioned aqueous treatment solution. In this case, calcium phosphate particles are caused to adhere to the sheet-shaped raw material before the aqueous preliminary treatment solution is completely dried.

15 Claims, 1 Drawing Sheet

FILTERING MATERIAL AND METHOD OF PRODUCING THE SAME

BACKGROUND OF THE INVENTION

1. Field of the Invention

The present invention relates generally to a filtering material employable for various kinds of application fields, e.g., a sanitary filter, a deodoring filter incorporated in a various kind of deodoring unit, and a foodstuff packing material having a capability of sterilizing and deodoring. More particularly, the present invention relates to a filtering material having a function for effectively and reliably adsorbing very fine infectious or antigenous particles such as virus, bacterial or the like. Further, the present invention relates to a method of producing a filtering material of the foregoing type.

2. Description of the Prior Art

The applicant common to the present invention has already made proposals with respect to a method of producing a novel filtering material for capturing very fine foreign material such as virus or the like under Japanese Patent Applications Nos. 278487/1990, 29301/1991 and 163903/1991.

Each of the proposed methods is practiced by way of the steps of preparing an aqueous treatment solution by dispersively dissolving a predetermined quantity of porous apatite particles and a predetermined quantity of water soluble glucan in water, dipping a sheet-shaped raw material in the aqueous treatment solution or spraying the latter over a sheet-shaped raw material or bringing a roller wetted with the aqueous treatment solution in contact with a sheet-shaped raw material, and drying the sheet-shaped raw material coated with the aqueous treatment solution while the porous apatite particles are included in the sheet-shaped raw material with the aid of the water soluble glucan serving as a binder.

Another method of the foregoing type proposed by the applicant is practiced by way of the steps of preparing an aqueous preliminary treatment solution by dissolving only water soluble glucan in water, allowing the preliminary treatment solution to adhere to a sheet-shaped raw material, thereafter, allowing porous apatite particles to adhere to the sheet-shaped raw material before the preliminary treatment solution is completely dried, and finally, drying the sheet-shaped raw material including the porous apatite particles with the aid of the water soluble glucan serving as a binder.

A characterizing feature of any one of the methods of the foregoing type each proposed by the applicant consists in that porous apatite particles composed of a kind of calcium phosphate particles are bonded to a sheet-shaped raw material with the aid of water soluble glucan serving as a binder.

In contrast with a conventional filtering material, a filtering material produced by employing each of the methods proposed by the applicant exhibits amazingly excellent properties of adsorbing and filtering very fine infectious or antigeneous foreign material such as virus, pollen or the like unattainable with the conventional filtering material. In the circumstances as mentioned above, the filtering material produced by employing each of the aforementioned proposed methods does not exhibit anything basically inconvenient for filter's users.

However, due to the fact that porous apatite particles are bonded to a sheet-shaped raw material via water soluble glucan, when a filtering material is practically used while it is dipped in water or it is wetted with water during practical use, the water soluble glucan is dissolved in water, resulting in the apatite particles being disconnected from the sheet-shaped raw material. For this reason, the filtering material can not be used under the aforementioned circumstances.

In addition, when the filtering material is used in an environment having a high content of moisture, the water soluble glucan absorbs the moisture, causing the surface of each porous apatite particle to be covered with the water soluble glucan. Otherwise, the surface of the filtering material becomes sticky.

When filtering materials are stored in an environment having some storage moisture, some mold appears and grows on the surface of each filtering material. Otherwise, the filtering material may transform undesirably.

SUMMARY OF THE INVENTION

The present invention has been made in consideration of the foregoing background.

An object of the present invention is to provide a filtering material which is produced using a binder having no water solubility wherein porous apatite particles and/or calcium phosphate particles are bonded to a sheet-shaped raw material.

Another object of the present invention is to provide a method of producing a filtering material of the foregoing type.

According to a first aspect of the present invention, there is provided a filtering material which comprises calcium phosphate particles, $\beta$-1,3-glucan, and a sheet-shaped raw material wherein the calcium phosphate particles are caused to adhere to the sheet-shaped raw material with the aid of the $\beta$-1,3-glucan serving as a binder.

According to a second aspect of the present invention, there is provided a method of a producing a filtering material of the foregoing type, wherein the method comprises a first step of stirring calcium phosphate particles of 0.5 to 30% by weight and $\beta$-1,3-glucan of 0.5 to 10% by weight in hot water at a high speed to prepare an aqueous treatment solution, a second step of dipping a sheet-shaped raw material in the aqueous treatment solution and taking up the sheet-shaped raw material coated with the aqueous treatment solution, and a third step of drying the sheet-shaped raw material coated with the aqueous treatment solution after completion of the taking-up operation.

In addition, according to a third aspect of the present invention, there is provided a method of producing a filtering material of the foregoing type, wherein the method comprises a first step of stirring $\beta$-1,3-glucan of 0.5 to 10% by weight in hot water at a high speed, and thereafter, adding calcium phosphate particles of 0.5 to 30% by weight and stirring the resultant mixture at a low speed to prepare an aqueous solution, a second step of dipping a sheet-shaped raw material in the aqueous treatment solution and taking up the sheet-shaped raw material, and a third step of drying the sheet-shaped raw material coated with the aqueous treatment solution after completion of the taking-up operation.

Additionally, according to a fourth aspect of the present invention, there is provided a method of producing a filtering material of the foregoing type, wherein the method comprises a first step of stirring calcium phosphate particles of 0.5 to 30% by weight and $\beta$-1,3-glucan of 0.5 to 10% by weight in hot water at a high speed to prepare an aqueous treatment solution, a second step of spraying the aqueous treatment solution toward a sheet-shaped raw material, and a third step of drying the sheet-shaped raw material coated with the sprayed aqueous treatment solution.

Further, according to a fifth aspect of the present invention, there is provided a method of producing a filtering material of the foregoing type, wherein the method comprises a first step of stirring β-1,3-glucan of 0.5 to 10% by weight in hot water at a high speed, and thereafter, adding calcium phosphate particles of 0.5 to 30% by weight and stirring the resultant mixture at a low speed to prepare an aqueous solution, a second step of spraying the aqueous treatment solution over a sheet-shaped raw material, and a third step of drying the sheet-shaped raw material coated with the sprayed aqueous treatment solution.

Further, according to a sixth aspect of the present invention, there is provided a method of producing a filtering material of the foregoing type, wherein the method comprises a first step of stirring calcium phosphate particles of 0.5 to 30% by weight and β-1,3-glucan of 0.5 to 10% by weight in hot water at a high speed to prepare an aqueous treatment solution, a second step of allowing the aqueous treatment solution to adhere to a sheet-shaped raw material with the aid of a rolling roller of which part is always immersed in the aqueous treatment solution, and a third step of drying the sheet-shaped raw material having the aqueous treatment solution adhering thereto.

Furthermore, according to a seventh aspect of the present invention, there is provided a method of producing a filtering material of the foregoing type, wherein the method comprises a first step of stirring β-1,3-glucan of 0.5 to 10% by weight in hot water at a high speed, and thereafter, adding calcium phosphate particles of 0.5 to 30% by weight and stirring the resultant mixture at a low speed to prepare an aqueous treatment solution, a second step of allowing the aqueous treatment solution to adhere to a sheet-shaped raw material with the aid of a rotating roller of which part is always immersed in the aqueous treatment solution, and a third step of drying the sheet shaped-raw material having the aqueous treatment solution adhering thereto.

Moreover, according to an eighth aspect of the present invention, there is provided a method of producing a filtering material of the foregoing type, wherein the method comprises a first step of stirring β-1,3-glucan of 0.5 to 10% by weight in hot water at a high speed to prepare an aqueous preliminary treatment solution having the β-1,3-glucan uniformly dispersed therein, a second step of allowing the aqueous treatment solution to adhere to a sheet-shaped raw material, a third step of allowing calcium phosphate particles to adhere to the sheet-shaped raw material before the sheet-shaped raw material having the aqueous preliminary treatment solution adhering thereto is completely dried, and a fourth step of drying the sheet-shaped raw material having the aqueous preliminary treatment solution and the calcium phosphate particles adhering thereto.

With the method according to the eighth aspect of the present invention, it is recommendable that the second step is executed by dipping the sheet-shaped raw material in the aqueous preliminary treatment solution and then taking up the sheet-shaped raw material coated with the aqueous preliminary treatment solution.

Alternatively, the second step may be executed by allowing the aqueous preliminary treatment solution to adhere to the sheet-shaped raw material by spraying the former toward the latter.

Further, the second step may be executed by allowing the aqueous preliminary treatment solution to adhere to the sheet-shaped raw material by bringing the latter to come in contact with a rotating roller of which part is normally immersed in the aqueous preliminary treatment solution.

In addition, it is recommendable that the third step is executed by spreading the calcium phosphate particles over the sheet-shaped raw material having the aqueous preliminary treatment solution adhering thereto.

Alternatively, the third step may be executed by blowing the calcium phosphate particles toward the sheet-shaped raw material having the aqueous preliminary treatment solution adhering thereto.

When the filtering material constructed according to the first aspect of the present invention is microscopically observed using an electron microscope, it is found that thread-shaped β-1,3-glucan is bonded to the sheet-shaped raw material as if it is entangled with fibers in the sheet-shaped raw material containing calcium phosphate particles.

A characterizing feature of the filtering material of the present invention consists in that the calcium phosphate particles adsorb very fine foreign material such as virus, fungus, pollen or the like by the action of ionic bond, hydrogen bond or by the action of multiple bond plus conformation derived from a Van der Waals force or mutual function appearing between bipole moments.

Another characterizing feature of the filtering material of the present invention consists in that virus bacteria, fungus, pollen or the like can reliably be adsorbed in an ample quantity of hydroxyles present in molecules of the β-1,3-glucan by the action of the hydrogen bond of the hydroxyles to saccaride chain and muccosaccarides on the surface of virus, bacteria, fungus, pollen or the like.

In addition, with the filtering material of the present invention, since the β-1,3-glucan is muccosaccarides which have not water solubility, there is no possibility that calcium phosphate particles are disconnected or parted from the sheet-shaped raw material when it is used in water in the immersed state. Similarly, even when it is used or stored in an environment containing a high content of moisture, there do not arise malfunctions that properties of the filtering material are not degraded, and moreover, some mold grows on the filtering material.

With respect to the method according to the second aspect of the present invention, the calcium phosphate particles and the β-1,3-glucan are stirred in hot water at a high speed at the first step of the method so that they are uniformly dispersed in hot water to prepare an aqueous treatment solution having high viscosity. Since the calcium phosphate particles are uniformly dispersed in the aqueous treatment solution, there is no possibility that they precipitate in the aqueous treatment solution.

When the sheet-shaped raw material is dipped in the aqueous treatment solution and then taken up from a treatment solution bath at the second step of the method, the β-1,3-glucan and the calcium phosphate particles are caused to adhere to the sheet-shaped raw material.

Subsequently, when the sheet-shaped raw material coated with the aqueous treatment solution is dried at the third step of the method, the calcium phosphate particles are bonded to the sheet-shaped raw material with the aid of the β-1,3-glucan serving as a binder, whereby production of a desired filtering material is completed.

The inventors microscopically observed how the β-1,3-glucan and the calcium phosphate particles were present in the structure of the filtering material.

It has been found that the β-1,3-glucan was present in the structure of the filtering material in the form of a ball-shaped substance composed of many fine threads entangled with each other. For this reason, the ball-shaped substance is not decomposed by itself merely by putting it in water. In other words, it is not dissolved in water.

Subsequently, when the β-1,3-glucan is stirred in hot water at a high speed by rotating a propeller, threads on the surface of the ball-shaped substance are caused to fluff or are peeled away from the ball-shaped substance.

Consequently, the fluffy ball-shaped substances, the calcium phosphate particles and many threads peeled away from the ball-shaped substances are uniformly dispersed in the aqueous treatment solution prepared at the first step of the method, and some ball-shaped substances are bonded to each other to form a net-shaped structure in such a manner that each ball-shaped substance is entangled with adjacent ball-shaped substance via the foremost end parts of threads extending therefrom. Thus, the calcium phosphate particles are engaged with the net-shaped structure.

When the sheet-shaped raw material is dipped in the aqueous treatment solution and taken up from the treatment solution bath at the second step of the method, the ball-shaped substances and the calcium phosphate particles adhere to the surface of the sheet-shaped raw material. Otherwise, they penetrate into fibers constituting the sheet-shaped raw material.

When the sheet-shaped raw material coated with the aqueous treatment solution is dried at the third step of the method, fluffy threads extending from each ball-shaped substance are entangled with fibers in the sheet-shaped raw material such that calcium phosphate particles are involved between adjacent ball-shaped substances jointed to each other via their threads. Otherwise, they penetrate into the fibers in the sheet-shaped raw material. In addition, the calcium phosphate particles are involved in and bonded to the sheet-shaped raw material in such a state that thread-shaped molecules of the β-1,3-glucan parted away from each ball-shaped substance are entangled with each other while forming a net-shaped structure. In such manner, the calcium phosphate particles are bonded to the sheet-shaped raw material.

Next, the first step of the method according to the third aspect of the present invention is different from that of the method according to the second aspect of the same in respect of the fact that a predetermined quantity of β-1,3-glucan is stirred in hot water at a high speed, and thereafter, a predetermined quantity of calcium phosphate particles are added to the β-1,3-glucan.

A characterizing feature of the method according to the third aspect of the present invention consists in that each calcium phosphate particle is bonded to a smaller calcium phosphate particle in order to prevent each calcium phosphate particles having a larger particle size are broken or disintegrated in fine pieces when it is stirred in hot water at a high sped.

Next, the second step of the method according to any one of the fourth aspect and the fifth aspect of the present invention is different from that of the method according to any one of the second aspect and the third aspect of the same in respect of the fact that an aqueous treatment solution is caused to adhere to a sheet-shaped raw material by spraying the former over the latter.

For example, in case that the sheet-shaped raw material is a sheet of paper of which surface is comparatively flat and of which fibers are closely entangled with each other, calcium phosphate particles can not penetrate into fibers of the paper merely by dipping the paper in the aqueous treatment solution, and moreover, they are readily peeled away from the surface of the paper even in the presence of β-1,3-glucan serving as a binder. For this reason, it is recommendable that the aqueous treatment solution is sprayed over the paper with a kinetic energy given to each calcium phosphate particle in order to assure that the calcium phosphate particles penetrate into fibers of the paper. Consequently, the calcium phosphate particles can more tightly be bonded to the sheet-shaped raw material.

As is well known, the paper becomes weak once it is wetted with water. For this reason, it is also recommendable to employ a spraying process for the purpose of preventing the paper from being broken or torn when it is taken up from the treatment solution bath.

In addition, also in case that the sheet-shaped raw material is not a sheet of paper but a woven cloth or an unwoven cloth, the spraying process is advantageously employable because calcium phosphate particles readily penetrate into fibers in the woven cloth or the unwoven cloth by allowing the aqueous treatment solution to collide against the sheet-shaped raw material with a kinetic energy given to each calcium phosphate particles.

With respect to the method according to any one of the sixth aspect and the seventh aspect of the present invention, an aqueous treatment solution is caused to adhere to a sheet-shaped raw material by bringing the latter in contact with a rotating roller of which part is always immersed in a treatment solution bath. To this end, a strip of sheet-shaped raw material is previously wound in the form of a roll, and as the sheet-shaped raw material is unrolled from the roll, it is continuously supplied to the treatment solution bath to come in contact with the rolling roller, resulting in the aqueous treatment solution adhering to the sheet-shaped raw material at a high efficiency.

Next, the method according to the eight embodiment of the present invention is different from the method according to any one of the second aspect to the seventh aspect of the present invention in respect of the fact that β-1,3-glucan and calcium phosphate particles are caused to separately adhere to a sheet-shaped raw material at a certain time interval.

When the β-1,3-glucan of 0.5 to 10% by weight is stirred in hot water at a high speed at the first step of the method, it is uniformly dispersed in hot water to prepare an aqueous preliminary treatment solution having high viscosity.

The aqueous preliminary treatment solution is caused to adhere to a sheet-shaped raw material at the second step of the method. The adhesion of the aqueous preliminary treatment solution to the sheet-shaped raw material is usually achieved by dipping the sheet-shaped raw material in the aqueous preliminary treatment solution and then taking up it from the treatment solution bath in the same manner as the method according to any one of the second aspect and the third aspect of the present invention. Alternatively, it may be achieved by spraying the aqueous preliminary treatment solution over the sheet-shaped raw material in the same manner as the method according to any one of the fourth aspect and the fifth aspect of the present invention. Otherwise, it may be achieved by bringing the sheet-shaped raw material in contact with a rolling roller of which part is always immersed in the aqueous preliminary treatment solution in the same manner as the method according to any one of the sixth embodiment and the seventh embodiment of the present invention.

Calcium phosphate particles are caused to adhere to the sheet-shaped raw material at the third step of the method before the aqueous preliminary treatment solution coated on the sheet-shaped raw material is completely dried. The adhesion of the calcium phosphate particles to the sheet-shaped raw material can be achieved, for example, by vibratively displace a sifter filled with calcium phosphate particles above the sheet-shaped raw material in the horizontal direction so as to allow the calcium phosphate particles to be spread over the sheet-shaped raw material. Alternatively, it may be achieved by blowing calcium phosphate particles over the sheet-shaped raw material with the aid of an air spray gun as they fall down from a vibrating hopper or a vibrating sifter.

It is preferable that an extent of drying the sheet-shaped raw material after the calcium phosphate particles adhere to the latter is adequately determined depending on a material employed for the sheet-shaped raw material and an application field of the filtering material.

Finally, the sheet-shaped raw material having the aqueous preliminary treatment solution and the calcium phosphate particles adhering thereto is dried at the fourth step of the method in the same manner as the method according to any one of second aspect to the seventh aspect of the present invention.

Other objects, features and advantages of the present invention will become apparent from reading of the following description which has been made in conjunction with the accompanying drawings.

BRIEF DESCRIPTION OF THE DRAWINGS

The present invention is illustrated in the following drawings in which.

DESCRIPTION OF THE PREFERRED EMBODIMENT

Figure 1:
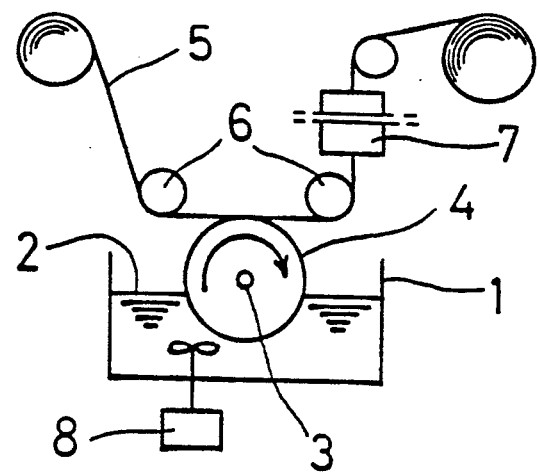
FIG. 1 is an illustrative view which shows the structure of an apparatus for allowing an aqueous treatment solution to adhere to a sheet-shaped raw material with the aid of a rotating roller of which part is always immersed in the aqueous solution.

The present invention will now be described hereinafter with reference to the accompanying drawings which shows a few apparatuses each serving to allow calcium phosphate particles to adhere to a sheet-shaped raw material.

As defined in claim 1 of the claim clause, according to the present invention, a filtering material comprises calcium phosphate particles, $\beta$-1,3-glucan, and a sheet-shaped raw material wherein the calcium phosphate particles are caused to adhere to the sheet-shaped raw material with the aid of $\beta$-1,3-glucan serving as a binder.

With respect to the method of the present invention defined in claim 2, calcium phosphate particles of 0.5 to 30% by weight and $\beta$-1,3-glucan of 0.5 to 10% by weight are stirred together in hot water at a high speed to prepare an aqueous treatment solution at the first step of the method.

Calcium phosphate used for practicing the method of the present invention is such that a mole ratio of calcium to phosphor (hereinafter referred to simply as a Ca/P ratio) ranges from 1.0 to 2.0, preferably 1.3 to 1.8, more preferably 1.5 to 1.67. It should be noted that calcium phosphate having a Ca/P ratio of 1.5 is called tricalcium phosphate and calcium phosphate having a Ca/P ratio of 1.67 is called apatite.

To practice each of the prior methods proposed by the applicant, porous apatite particles were employed as an essential component constituting a filtering material. Later, the inventors conducted a variety of research works and found that not only apatite but also calcium phosphate exhibited substantially same adsorbing properties.

Calcium phosphate particles having a particle size of 0.1 to 50 $\mu$m is practically employed for practicing the method of the present invention. It is recommendable that calcium phosphate particles having a large particle size are prepared in the form of porous secondary particles. Each porous secondary particle is such that very fine calcium phosphate crystalline particles (primary particles) are aggregated together to become a particle having a large particle size. For example, a suspension containing very fine calcium phosphate particles is sprayed in an environment having a high temperature to prepare porous secondary particles. Otherwise, very fine calcium phosphate particles are stirred and granulated in the presence of a suitable binder. Secondary particles each having excellent rigidity can be obtained by baking the porous secondary particles prepared in the above-described manner.

The $\beta$-1,3-glucan is muccosaccaride having no water solubility and has a structure as represented by the following chemical formula. In practice, it is commercially sold as an additive for noodle, fictile product of fish or the like. It should be added that it is a fermented muccosaccaride produced by microbes.

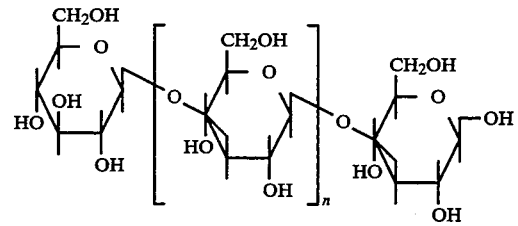

chemical formula of $\beta$-1,3-glucan (n=400 to 500)

Usually, a commercial product of $\beta$-1,3-glucan is provided in the form of aggregated particles each having a particle size of several ten pm to several hundred $\mu$m. For this reason, it can not dispersively be dissolved in water unless it is first put in hot water having a temperature of 30° C. to 60° C. and the resultant mixture is then stirred at a high speed of 3,000 rpm or more.

According to a first embodiment of the method of the present invention as defined in claim 2, calcium phosphate particles of 10% by weight and $\beta$-1,3-glucan of 4% by weight are put in hot distilled water having a temperature of 30° C. to 60° C. and the resultant mixture is stirred at a high speed of 5,000 rpm for five minutes to prepare an aqueous treatment solution. In this embodiment, the calcium phosphate particles have an average particle size of 1 μm, a Ca/P ratio of each calcium phosphate particle is 1.67 and a specific surface area of each calcium phosphate particle is about 50 m²/g.

In addition, according to a second embodiment of the method of the present invention as defined in claim 2, calcium phosphate particles of 10% by weight and β-1,3-glucan of 4% by weight are put in hot distilled water having a temperature of 30° C. to 60° C. and the resultant mixture is stirred at a high speed of 3,000 rpm for 10 minutes to prepare an aqueous treatment solution. In this embodiment, the calcium phosphate particles have an average particle size of 0.5 μm, a C/P ratio of calcium phosphate is 1.5 and a specific surface area of each calcium phosphate particle is about 60 m²/g.

When a sheet-shaped raw material is dipped in the aqueous treatment solution and then taken up from a treatment solution bath at the second step of the method, it is found that the aqueous treatment solution adhere to the sheet-shaped raw material in such a manner that the latter is wetted with the former. The dipping of the sheet-shaped raw material in the aqueous treatment solution can be achieved by repeatedly putting the former in that latter and then take up the former from the treatment solution bath while holding the former with operator's hands. Alternatively, it may be achieved by continuously unrolling a strip of sheet-shaped raw material from a roll of the latter and then allowing it to move through the aqueous treatment solution in the treatment solution bath from one end side to the opposite end side of the treatment bath in the dipped state. In this case, the aqueous treatment solution can adhere to the sheet-shaped raw material at a high efficiency.

A woven cloth and an unwoven cloth woven with natural fibers, synthetic fibers or a mixture of both the fibers are employable as a typical sheet-shaped raw material. In addition, a fabric woven with cotton fibers and a sheet of foamed polyurethane are also employable for the same purpose.

After the aqueous treatment solution adheres to the sheet-shaped raw material, the latter is dried at the third step of the method to produce a filtering material. The drying is usually achieved at a room temperature. Alternatively, when the sheet-shaped raw material coated with the aqueous treatment solution is caused to continuously pass through a hot atmosphere having a temperature of e.g., 100° C. to 150° C., the drying can be achieved at a high efficiency.

Next, with respect to the method of the present as defined in claim 3, β-1,3-glucan of 0.5 to 10% by weight is first put in hot water having a temperature of 30° C. to 60° C. and then stirred at a high speed of 3,000 rpm or more at the first step of the method to prepare an aqueous preliminary treatment solution in which only β-1,3-glucan particles are uniformly dispersed in hot water. Subsequently, a predetermined quantity of calcium phosphate particles are put in the aqueous preliminary treatment solution and the resultant mixture is then stirred at an intermediate low speed of 100 rpm or more so as to allow the calcium phosphate particles to be uniformly dispersed in the aqueous preliminary treatment solution to prepare an aqueous treatment solution.

The reason why the aqueous treatment solution is prepared by way of two steps consists in assuring that porous secondary particles composed of calcium phosphate are not destroyed by stirring them at a high speed.

According to an embodiment of the method of the present invention as defined in claim 3, β-1,3-glucan of 5% by weight is first put in hot distilled water having a temperature of 30° C. to 60° C. and then stirred at a high speed of 10,000 rpm for 3 minutes to prepare an aqueous preliminary treatment solution. Subsequently, calcium phosphate particles having the same weight as that of the β-1,3-glucan is put in the aqueous preliminary treatment solution and the resultant mixture is stirred at a high speed of 1,000 rpm for 3 minutes to prepare an aqueous treatment solution. In this embodiment, the calcium phosphate particles have an average particle size of 10 μm, a Ca/P ratio of calcium phosphate is 1.67 and a specific surface area of each calcium phosphate particle is about 20 m²/g.

The second step and the third step of the method as defined in claim 3 are same as those of the method as defined in claim 2.

In addition, the method as defined in any one of claim 4 and claim 5 is different from that as defined in any one of claim 2 and claim 3 in respect of the second step of allowing the aqueous treatment solution to adhere to the sheet-shaped raw material, and the first step and the third step of the former are same as those of the latter.

In addition, with the respect to the method of the present invention as defined in any one of claim 4 and claim 5, an aqueous treatment liquid is caused to adhere to a sheet-shaped raw material by spraying the former over the latter.

In contrast with the method of the present invention as defined in any one of claim 2 and claim 3 wherein the aqueous treatment solution adheres to the sheet-shaped raw material by dipping the latter in the former and then taking up the latter from the treatment solution bath, a paper having poor toughness and readily broken or torn when it is wetted with water can be employed as a sheet-shaped raw material. In addition to a fabric woven with cotton fibers and a sheet of foamed polyurethane, a thin pulp paper or a thin traditional Japanese paper having excellent air permeability can be employed as a sheet-shaped raw material.

When the aqueous treatment liquid is sprayed over the sheet-shaped raw material, mouth blowing, i.e., so-called mouth liquid atomizing can be employed on the experimental basis. Since calcium phosphate particles can not fly at a sufficiently high speed when a liquid atomizing process is employed, it is preferable that a distance between a sheet-shaped raw material and an atomizer is set to about 30 cm.

When a filtering material is produced on the industrial basis, it is preferable that a spray gun operable at air pressure of several kg/cm² is used for practicing a spraying/atomizing process. In addition, it is preferable that a distance between the sheet-shaped raw material and the spray gun is set to about 1 m. Additionally, it is desirable from the viewpoint of mass production that a strip of sheet-shaped raw material is previously wound in the form of a roll so that as the sheet-shaped raw material is unrolled from the roll, it is caused to continuously move in front of the spray gun.

A quantity of aqueous treatment liquid to be sprayed toward the sheet-shaped raw material per unit time is determined such that the whole surface of the sheet-shaped raw material is sufficiently wetted with the sprayed aqueous treatment solution. If a part of the sheet-shaped raw material fails to be wetted with the aqueous treatment solution, this means that a product of filtering material is not acceptable because the foregoing part is not coated with the aqueous treatment solution as if an empty hole is opened at the foregoing part. On the contrary, if an excessive quantity of aqueous treatment solution is sprayed over the sheet-shaped raw material, there arises a malfunction that an excessive quantity of aqueous treatment solution falls down uselessly.

When the sheet-shaped raw material has a heavy thickness, it is recommendable that the aqueous treatment liquid is sprayed toward the sheet-shaped raw material from the opposite sides.

In case that the sheet-shaped raw material is a sheet of paper having poor toughness, it is preferable that the aqueous solution is sprayed toward the paper sheet from the front side while the rear surface of the paper is lined with a backup plate. On completion of the spraying operation, the paper sheet adheres to the backup plate in the presence of the aqueous treatment solution, causing subsequent handling or treatment to be easily achieved.

The method as defined in any one of claim 6 and claim 7 is different from the method as defined in any one of claim 2 to claim 5 in respect of the fact that the second step of adhering an aqueous treatment solution to a sheet-shaped raw material is executed by adhering the aqueous treatment solution to the sheet-shaped raw material with the aid of a rotating roller of which part is always immersed in the aqueous treatment solution.

A woven cloth and an unwoven cloth woven with natural fibers, synthetic fibers or a mixture of both the fibers, a fabric woven with cotton fibers, a sheet of foamed polyurethane, a sheet of thin pulp paper and a sheet of thin traditional Japanese paper each having excellent air permeability can be noted as typical sheet-shaped raw materials employable for practicing the method of the present invention.

It is recommendable that the adhesion of the aqueous treatment solution to the sheet-shaped raw material is achieved by employing an apparatus as shown in FIG. 1. Specifically, as shown in the drawing, a drum 4 including a horizontally extending shaft 3 of which part is always immersed in an aqueous treatment solution 2 in a treatment solution bath 1 is continuously rotated so as to allow the outer surface of the drum 4 to be wetted with the aqueous treatment solution 2.

On the other hand, a strip of sheet-shaped raw material 5 is previously wound in the form of a roll, and as the sheet-shaped raw material 5 is unrolled from the roll, it is brought in contact with the drum 4 while it is bridged between an opposing pair of idler rollers 6. With the apparatus as shown in FIG. 1, it is assumed that the sheet-shaped raw material 5 moves from the left-hand side to the right-hand side as seen in the drawing and passes through a heater 7 disposed at the intermediate position of a movement path so as to dry the sheet-shaped raw material coated with the aqueous treatment solution 2. It should be noted that the feeding speed of the sheet-shaped raw material 5 is set so as not to excess the circumferential speed of the drum 4. This is because if the feeding speed of the sheet-shaped raw material 5 exceeds the circumferential speed of the drum 4, there arises a malfunction that the aqueous treatment solution 2 can not sufficiently be delivered to the sheet-shaped raw material 5, resulting in some part of the sheet-shaped raw material 5 failing to be coated with the aqueous treatment solution 5.

Figure 2:
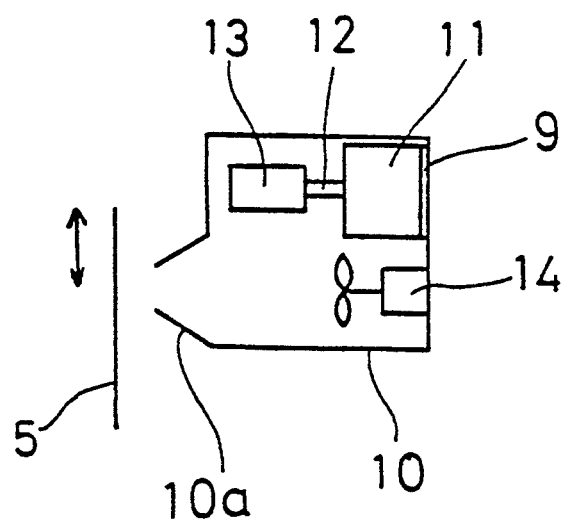
FIG. 2 is an illustrative view which shows the structure of an apparatus for blowing calcium phosphate particles over a sheet-shaped raw material coated with an aqueous treatment solution.

As is apparent from the above description, a quantity of adhesion of the aqueous treatment solution 2 to the sheet-shaped raw material 5 varies depending on a difference between the circumferential speed of the drum 4 and the moving speed of the sheet-shaped raw material 5. Thus, it is assumed that a quantity of adhesion of the aqueous treatment solution 2 to the sheet-shaped raw material 5 is determined such that the sheet-shaped raw material 5 is sufficiently wetted with the aqueous treatment solution 2 at all times. This is because if a part of the sheet-shaped raw material 5 fails to be wetted with the aqueous treatment solution 2, the foregoing part does not function as a filtering material, and moreover, if the sheet-shaped raw material 5 is excessively wetted with the aqueous treatment solution 2, an excessive part of the aqueous treatment solution 2 uselessly falls down. In some case, the sheet-shaped raw material 5 may continuously be supplied in the leftward direction while the drum 4 is unchangeably rotated in the clockwise direction as shown in FIG. 2.

It is desirable that the aqueous treatment solution 2 is always stirred by rotating a stirrer 8 in order to assure that calcium phosphate particles in the aqueous treatment solution 2 does not precipitate in the bottom of the treatment solution bath 1.

The method as defined in claim 8 is different from the method as defined in any one of claim 2 to claim 7 in respect of the fact that calcium phosphate particles are caused to adhere to the sheet-shaped raw material as they are.

To practice the method as defined in claim 8, $\beta$-1,3-glucan of 0.5 to 10% by weight is put in hot distilled water having a temperature of 30° C. to 60° C. and then stirred at a high speed of 3,000 rpm or more to prepare an aqueous preliminary treatment solution at the first step of the method.

To allow the thus prepared aqueous preliminary treatment solution to adhere to the sheet-shaped raw material at the second step of the method, it is recommendable that the sheet-shaped raw material is dipped in the aqueous preliminary treatment solution and then taken up from the treatment solution bath in the same manner as the method defined in any one of claim 2 and claim 3.

Alternatively, the aqueous preliminary treatment solution may be sprayed over the sheet-shaped material for the same purpose in the same manner as the method as defined in any one of claim 4 and claim 5.

Otherwise, the aqueous preliminary treatment solution may be caused to adhere to the sheet-shaped raw material with the aid of a rotating roller of which part is always immersed in the aqueous preliminary treatment solution in the same manner as the method as defined in any one of claim 6 and claim 7 (see FIG. 1).

Next, calcium phosphate particles are caused to adhere to the sheet-shaped raw material at the third step of the method before the sheet-shaped raw material having the aqueous preliminary treatment solution adhering thereto is completely dried. It is recommendable that the adhesion of the calcium phosphate particles to the sheet-shaped raw material is achieved, for example, by vibratively displace a sifter filled with calcium phosphate particles on a sheet-shaped raw material in the horizontal direction so as to allow them to be spread over the sheet-shaped raw material.

It is preferable that the spreading of the calcium phosphate particles over the sheet-shaped raw material in the above-described manner is achieved by softly adhering the calcium phosphate particles to the sheet-shaped raw material in case that an extent of drying the aqueous treatment solution on the sheet-shaped raw material is small, in other words, in case that the sheet-shaped raw material is kept still wet directly after the aqueous preliminary treatment solution adheres to the sheet-shaped raw material. This is because that if calcium phosphate particles are sprayed over the sheet-shaped raw material while the latter is sufficiently wetted with the aqueous preliminary treatment solution, there is a possibility that they penetrate into the aqueous preliminary treatment solution with the result that when the sheet-shaped raw material coated with the aqueous treatment solution is dried, each calcium phosphate particle is closely surrounded by $\beta$-1,3-glucan, causing the number of calcium phosphate particles effective for adsorbing infectious or antigenous very fine particles to be reduced.

In some case, a process of blowing calcium phosphate particles toward the sheet-shaped raw material is more acceptably employable than a process of spreading the formed over the latter depending on an extent of drying the sheet-shaped raw material coated with the aqueous preliminary treatment solution or a material employed for the sheet-shaped raw material.

For example, to practice the method of the invention at a high efficiency, it is desirable to shorten the total processing time by positively evaporating moisture in the sheet-shaped raw material while the latter moves through a heater. In this case, however, the aqueous preliminary treatment solution is half dried in the course of a process of evaporation with the result that it is unavoidable that the calcium phosphate particles hardly adhere to the sheet-shaped raw material. To obviate the foregoing malfunction, it is recommendable that the calcium phosphate particles are caused to adhere to the sheet-shaped raw material by blowing the former toward the latter.

In case that a sheet of pulp paper or a sheet of traditional Japanese paper is employed as a sheet-shaped raw material and calcium phosphate particles are placed on the paper merely by allowing them to adhere the paper coated with the aqueous preliminary treatment solution, there arises a malfunction that each of the calcium phosphate particles is readily peeled away from the paper when the surface of a filter material is rubbed with a certain article, e.g., an operator's hand after completion of a drying operation. In such a case as mentioned above, it is recommendable that calcium phosphate particles are blown over the paper so that they penetrate into fibers in the paper or a layer of half dried preliminary treatment solution with the aid of kinetic energy given to each calcium phosphate particle so as to enable them to stably adhere to the sheet-shaped raw material.

To blow calcium phosphate particles over the sheet-shaped raw material, it is preferable that an apparatus as shown in FIG. 2 is practically used. Specifically, the apparatus includes a case 10 in which a vibrator 11 is disposed with a vibration proof material 9 interposed therebetween. A sifter 13 having a fine mesh size is mounted on the foremost end of an output shaft 12 of the vibrator 11, and after calcium phosphate particles are filled in the sifter 13, the vibrator 11 is activated to vibrate. As the vibrator 13 vibrates, the calcium phosphate particles fall down from the sifter 13. At this time, an air stream generated by rotating a blower 14 disposed below the vibrator 11 blows the calcium sulphite particles toward a sheet-shaped raw material 5 having a half dried preliminary treatment solution adhering thereto through a discharge port 10a in the horizontal direction. Thus, the calcium phosphate particles intensely collide against the sheet-shaped raw material 5, resulting in them reliably adhering to the latter.

It should be added that a blowing machine usually employed for a so-called sand blasting operation can be used for the foregoing purpose under a condition that a blowing capacity of the blowing machine is substantially reduced.

It is desirable that a quantity of adhesion of the calcium phosphate particles to the sheet-shaped raw material per 1 $m^2$ is determined to remain within the range of 5% to 100% of an unit weight of the sheet-shaped raw material (weight of the latter per 1 $m^2$).

The fourth step (drying step) of the method as defined in claim 8 can be performed in the same manner as the method as defined in any one of claim 2 to claim 7.

To practice the method of the present invention as defined in any one of claim 2 to claim 8, it is preferable that a product of filtering material passes between an opposing pair of heat rollers so as to thermally press it therebetween at a temperature of about 150° C., causing it to be thermally set. This is because bonding of the calcium phosphate particles to fibers in the sheet-shaped raw material by the action of weak hydrogen bond or electrostatic bond is readily broken or destroyed as the filtering material is repeatedly bent or folded with the exception of the state that calcium phosphate particles tightly penetrate into fibers in the sheet-shaped raw material. The thermal setting of the filtering material is effective not only for strengthening the net-shaped structure of fibers by the action of thermal pressing but also for physically reinforcing the readily breakable bonded structure composed of fibers and calcium phosphate particles. Once the filtering material is subjected to thermal setting, bound water does not escape from the structure of the filtering material but only free water is evaporated therefrom, resulting in adsorbing properties of the filtering material being improved.

An example representing virus adsorbing capability of a filtering material produced in accordance with the present invention will be shown below in Table 1. It should be noted that the filtering material produced by practicing the method of the present invention exhibits substantially same properties by employing the method as defined in any one of claim 2 to claim 8.

TABLE 1

| sample | virus titer | |
|---|---|---|
| | hemagglutination test | neutralization test (PFU) |
| blank | 256 | $10^4$ |
| unwoven cloth | 256 | $10^4$ |
| filtering material of the present invention | 32 | $<10$ |

Table 1 shows the results derived from a hemagglutination test and a neutralization test both of which were conducted for determining a virus titer of the filtering material by allowing a suspension including influenza virus (A/PR/8) to pass through a sample of the filtering material.

Here, the hemagglutination test refers to a test of allowing chickin's red cells to be coagulated together in the presence of influenza virus, and the presence or absence of the influenza virus can be detected based on the result representing the presence or absence of the influenza virus after completion of the hemagglutation test. The result representing a virus titer of 256 shows that coagulation took place even when the suspension which had passed through the filtering material was diluted with saline by a quantity of 256 times.

In addition, the neutralization test refers to a test of allowing the influenza virus to destroy lung cells of a human's embryo when it adheres to them, and a numeral $10^4$ representing the virus titer shows the number of destroyed cells.

Table 2 shows by way of example a bacteria adsorbing capability of the filtering material produced with the method of the present invention.

TABLE 2

| sample | the number of bacteria which had passed through the filtering material | | |
|---|---|---|---|
| | Escherichica coli | Staphylococcus aureus | Pseudomonas aerugonosa |
| sheet-shaped paper | $10^5$ | $10^5$ | $10^5$ |
| unwoven cloth | $10^5$ | $10^5$ | 105 |
| filtering material (sheet-shaped paper used as a sheet) | <10 (detection failed) | <10 | <10 |
| filtering material (unwoven cloth used as a sheet) | <10 | <10 | <10 |

Specifically, Table 2 shows, by way of the number of bacteria remaining in each suspension after completion of flowing through the filtering material of the present invention, the capability for adsorbing bacteria in the filtering material when suspensions including bacteria, i.e., Escherichia coli, Staphylococcus aureus and Pseudomonas aerugonosa were caused to pass through the filtering material of the present invention. It should be noted that the number of bacteria included in each suspension prior to flowing through the filtering material of the present invention was $10^6$.

As is apparent from Table 2, the filtering material of the present invention assures that any kind of bacteria can not permeate through the same.

Next, an example representing a deodoring capability of the filtering material of the present invention is shown below in Table 3.

TABLE 3

| odoring substance | concentration measured at each measuring time (ppm) | | |
|---|---|---|---|
| | at a starting time | after one minute | after two minute |
| ammonia | 100 | 3 | 0 |
| hydrogen sulfide | 100 | 5 | 0 |
| trimethylamine | 100 | 4 | 0 |
| methyl mercaputan | 100 | 20 | 8 |
| phenol | 50 | 5 | 0 |
| acetaldehyde | 50 | 10 | 2 |
| valeric acid | 50 | 20 | 7 |
| acetic acid | 50 | 8 | 0 |
| ethylene oxide | 50 | 4 | 0 |

Specifically, Table 3 shows the results derived from evaluation on the deodoring capability of the filtering material which was practically evaluated in a stationary state. In practice, the deodoring capability of the filtering material was evaluated in the stationary state in such a manner that an odoring substance having an initial concentration (e.g., 50 ppm or 100 ppm) and a square filtering material of the present invention having dimensions 10 cm × 10 cm were received in a tetrabag having a capacity of 3 liters and the present concentration of the odoring substance was measured at each sampling time by using a detection tube. Numerals representing the results derived from the measurements are shown in Table 3 by way of ppm in unit.

In addition, another example representing a deodoring capability of the filtering material of the present invention is shown in Table 4.

TABLE 4

| odoring substance | filtering material | concentration prior to air passage | concentration prior to air passage | differential pressure (mm H$_2$O) |
|---|---|---|---|---|
| ammonia | unwoven cloth | 100 | 60 | 6.0 |
| | filtering material of the present invention | 100 | 5 | 6.2 |
| trimethylamine | unwoven cloth | 100 | 70 | 6.1 |
| | filtering material of the same | 100 | 2 | 6.1 |
| hydrogen sulfide | unwoven cloth | 100 | 60 | 6.0 |
| | filtering material of the same | 100 | 4 | 6.1 |
| ethylene oxide | unwoven cloth | 50 | 40 | 6.0 |
| | filtering material of the same | 50 | 4 | 6.1 |

Similarly, Table 4 shows the results derived from evaluation on the deodoring capability of the filtering material which was practically evaluated by measuring air permeability and deodoring capability of the filtering material of the present invention. In practice, the air permeability and the deodoring capability of the filtering material were evaluated in such a manner that an air stream containing an odoring substance having an initial concentration (e.g., 50 ppm or 100 ppm) was caused to pass through the filtering material and a concentration of the deodoring substance after completion of the passage of the air stream therethrough was then measured. Numerals on the table represent the deodoring capability of the filtering material by way of ppm in unit.

Specifically, a tetrabag having a capacity of 3 liters for supplying an air stream was connected to another tetrabag having a capability of 3 liters for recovering the supplied air stream via an air venting tube. In addition, a pump, a flow meter and a holder for the filtering material of the present invention were disposed along the air venting tube in accordance with an order as seen from the supply side. As the pump was driven, an air stream containing an odoring substance was forcibly caused to pass through the filtering material held by the holder, and a concentration of the odoring substance remaining in the air stream in the tetrabag on the recovery side was then measured by using a detection tube. It should be noted that measurements were conducted under a condition that a flow rate of the air stream was set to one liter/minute and an air permeation surface area was set to 15 cm$^2$. In addition, a differential pressure shown in Table 4 represents a difference between the pressure of the air stream before it reached the filtering material and the pressure of the same after it passed therethrough. Numerals shown in Table 4 are represented by mm H$_2$O in unit.

While the present invention has been described above with respect to several embodiments and examples thereof, it should of course be understood that the present invention should not be limited only to these embodiments but various change or modification may be made without departure from the scope of the present invention as defined by the appended claims.

What is claimed is:

1. A filtering material comprising calcium phosphate particles, water insoluble β-1,3-glucan, and a sheet-shaped raw material wherein said calcium phosphate particles are caused to adhere to said sheet-shaped material with the aid of said β-1,3-glucan serving as a binder.

2. A method of producing a filtering material comprising:
   a first step of stirring calcium phosphate particles of 0.5 to 30% by weight and water insoluble β-1,3-glucan of 0.5 to 10% by weight in hot water at a high speed to prepare an aqueous treatment solution, said hot water being at a sufficient temperature to uniformly disperse the β-1,3-glucan therein when stirred at a high speed, said high speed stirring being carried out by a stirrer at a speed sufficient to uniformly disperse the calcium phosphate particles and the β-1,3-glucan in the hot water,
   a second step of dipping a sheet-shaped raw material in said aqueous treatment solution to coat it with said aqueous treatment solution and taking up said sheet-shaped material, and
   a third step of drying said sheet-shaped material coated with said aqueous treatment solution after completion of the taking-up operation.

3. A method of producing a filtering material comprising:
   a first step of stirring water insoluble β-1,3-glucan of 0.5 to 10% by weight in hot water at a high speed, and thereafter, adding calcium phosphate particles of 0.5 to 30% by weight and stirring the resultant mixture at a low speed to prepare an aqueous treatment solution, wherein said hot water is at a temperature sufficient to disperse the β-1,3-glucan therein when stirred at a high speed and wherein said high speed stirring is carried out by means of a stirrer at a speed sufficient to uniformly disperse the β-1,3-glucan in the hot water and the subsequent low speed stirring is at a speed sufficient to disperse the calcium particles uniformly with the β-1,3-glucan in the hot water.
   a second step of dipping a sheet-shaped material coated with said aqueous treatment solution to coat it and taking up said sheet-shaped material, and
   a third step of drying said sheet-shaped material coated with said aqueous treatment solution after completion of the taking-up operation.

4. A method of producing a filtering material comprising:
   a first step of stirring calcium phosphate particles of 0.5 to 30% by weight and water insoluble β-1,3-glucan of 0.5 to 10% by weight in hot water at a high speed to prepare an aqueous treatment solution, said hot water being at a sufficient temperature to uniformly disperse the β-1,3-glucan therein when stirred at a high speed, said high speed stirring being carried out by a stirrer at a speed sufficient to uniformly disperse the calcium phosphate particles and the β-1,3-glucan in the hot water,
   a second step of spraying said aqueous solution onto a sheet-shaped material to coat it, and
   a third step of drying said sheet-shaped material coated with said sprayed aqueous treatment solution.

5. A method of producing a filtering material comprising:
   a first step of stirring water insoluble β-1,3-glucan of 0.5 to 10% by weight in hot water at a high speed, and thereafter, adding calcium phosphate particles of 0.5 to 30% by weight and stirring the resultant mixture at a low speed to prepare an aqueous treatment solution, wherein said hot water is at a temperature sufficient to disperse the β-1,3-glucan therein when stirred at a high speed, said high speed stirring being carried out by means of a stirrer at a speed sufficient to uniformly disperse the β-1,3-glucan in the hot water and the subsequent low speed stirring is at a speed sufficient to disperse the calcium particles uniformly with the β-1,3-glucan in the hot water,
   a second step of spraying said aqueous treatment solution onto a sheet-shaped material to coat it, and
   a third step of drying said sheet-shaped material coated with said sprayed aqueous treatment solution.

6. A method of producing a filtering material comprising:
   a first step of stirring calcium phosphate particles of 0.5 to 30% by weight and water insoluble β-1,3-glucan of 0.5 to 10% by weight in hot water at a high speed to prepare an aqueous treatment solution, said hot water being at a sufficient temperature to uniformly disperse the β-1,3-glucan therein when stirred at a high speed, said high speed stirring being carried out by a stirrer at a speed sufficient to uniformly disperse the calcium phosphate particles and the β-1,3-glucan in the hot water,
   a second step of allowing said aqueous treatment solution to adhere to a sheet-shaped material with the aid of a rotating roller of which part is always immersed in said aqueous treatment solution, and
   a third step of drying said sheet-shaped material having said aqueous treatment solution adhering thereto.

7. A method of producing a filtering material comprising:
   a first step of stirring water insoluble β-1,3-glucan of 0.5 to 10% by weight in hot water at a high speed, and thereafter, adding calcium phosphate particles of 0.5 to 30% by weight and stirring the resultant mixture at a low speed to prepare an aqueous treatment solution, wherein said hot water is at a temperature sufficient to disperse the β-1,3-glucan therein when stirred at a high speed, said high speed stirring is carried out by means of a stirrer at a speed sufficient to uniformly disperse the β-1,3-glucan in the hot water and wherein the subsequent low speed stirring is at a speed sufficient to disperse the calcium particles uniformly with the β-1,3-glucan in the hot water,
   a second step of allowing said aqueous treatment solution to adhere to a sheet-shaped material with the aid of a rotating roller of which part is always immersed in said aqueous treatment solution, and a third step of drying said sheet-shaped material having said aqueous treatment solution adhering thereto.

8. A method of producing a filtering material comprising:
- a first step for stirring water insoluble β-1,3-glucan of 0.5 to 10% by weight in hot water at a high speed to prepare an aqueous preliminary treatment solution having said β-1,3-glucan uniformly dispersed therein, said hot water being at a temperature sufficient to disperse the β-1,3-glucan therein when stirred at a high speed and wherein said high speed stirring is carried out by means of a stirrer at a speed sufficient to uniformly disperse the β-1,3-glucan in the hot water,
- a second step of allowing said aqueous preliminary treatment solution to adhere to a sheet-shaped material,
- a third step of allowing calcium phosphate particles to adhere to said sheet-shaped material before said sheet-shaped material having said aqueous preliminary treatment solution adhering thereto is completely dried, and
- a fourth step of drying said sheet-shaped material having said aqueous preliminary treatment solution and said calcium phosphate particles adhering thereto.

9. The method according to claim 8, wherein said second step is executed by dipping said sheet-shaped material in said aqueous preliminary treatment solution and then taking up said sheet-shaped material coated with said aqueous preliminary treatment solution.

10. The method according to claim 8, wherein said second step is executed by allowing said aqueous preliminary treatment solution to adhere to said sheet-shaped material by spraying the former onto the latter.

11. The method according to claim 8, wherein said second step is executed by allowing said aqueous preliminary treatment solution to adhere to said sheet-shaped material by bringing the latter into contact with a rotating roller of which part is normally immersed in said aqueous preliminary treatment solution.

12. The method according to any one of claims 8 to 11, wherein said third step is executed by spraying said calcium phosphate particles over said sheet-shaped material having said aqueous preliminary treatment solution adhering thereto.

13. The method according to any one of claims 8 to 11, wherein said third step is executed by blowing said calcium phosphate particles onto sheet-shaped material having said aqueous preliminary treatment solution adhering thereto.

14. The method according to claims 2, 4, 6 or 8, wherein said hot water is at a temperature of 30° C. to 60° C. and the high speed stirring is carried out at a speed of 3000 rpm or more.

15. The method according to claims 3, 5 or 7 wherein said hot water is at a temperature of 30° C. to 60° C., the high speed stirring is carried out at a speed of 3000 rpm or more and the low speed stirring is carried out at a speed of about 100 rpm but below 3000 rpm.

* * * * *